United States Patent [19]

Curr et al.

[11] 4,426,223
[45] Jan. 17, 1984

[54] REFINING OF FERROCHROMIUM METAL

[75] Inventors: Thomas R. Curr, Houghton Johannesburg; Nicholas A. Barcza, Randburg, both of South Africa

[73] Assignees: Council for Mineral Technology, Randburg; Middleburg Steel and Alloys (Proprietary) Limited, Sandown, both of South Africa

[21] Appl. No.: 434,752

[22] Filed: Oct. 18, 1982

[30] Foreign Application Priority Data

Oct. 19, 1981 [ZA] South Africa ............... 81/7209

[51] Int. Cl.$^3$ ............................................. C22B 4/00
[52] U.S. Cl. ........................................ 75/10 R; 75/12; 75/130.5
[58] Field of Search .................................. 75/10–12, 75/130.5

[56] References Cited

U.S. PATENT DOCUMENTS

| | | | |
|---|---|---|---|
| 789,093 | 1/1958 | Stevens | 126/99 R |
| 1,465,576 | 2/1922 | Hancock | 40/23 A |
| 2,776,882 | 1/1957 | Chadwick | 75/28 |
| 2,845,342 | 7/1958 | Udy | 75/11 |
| 3,615,349 | 10/1971 | Bleloch | 75/11 |
| 3,779,740 | 12/1973 | Adachi et al. | 75/12 |

OTHER PUBLICATIONS

*Journal of Metals*, "In-Flight Plasma Reduction of Domestic Chromite" (Aug. 1981), pp. 43–49, (By: J. J. Moore, K. J. Reid, J. K. Tylko).

*Chemical Engineering*, "Plasma Process is Ready for Metals Recovery" (Feb. 26, 1979), pp. 75–77, (By: Peter R. Savage).

*Primary Examiner*—Peter D. Rosenberg
*Attorney, Agent, or Firm*—Finnegan, Henderson, Farabow, Garrett & Dunner

[57] ABSTRACT

A process for the refining of high carbon ferrochromium metal in which the ferrochromium metal is refined, in the liquid state, with liquid metal oxide, generally including oxide fines. The heating is carried out in a transferred arc thermal plasma with substantial exclusion of carbon; although a consumable carbon electrode can be employed to generate the plasma. The ferrochromium metal is preferably premixed with the required oxides and fluxes and the feed is added to the furnace bath at a rate controlled to ensure that the slag and metal remain molten and at a chosen temperature.

17 Claims, No Drawings

REFINING OF FERROCHROMIUM METAL

BACKGROUND TO THE INVENTION

This invention relates to the refining of ferrochromium metal and, more particularly, to the refining of high carbon ferrochromium metal to remove some carbon therefrom and also reduce the silicon content.

In the past, refining of silicon and carbon in ferrochromium metal by the addition of metal oxides has, apart from by gas injection processes such as Argon-oxygen decarburization (A.O.D.), only been achieved in the solid state under considerable vacuum in the so-called simplex process.

In this specification the term "fines" is intended to mean subdivided material having a size of less than 6 mm and includes sizes of less than 2 mm which is, in many cases, considered unsaleable in respect of certain material such as ferrochromium, for example. It is the object of this invention to provide an improved refining process for ferrochromium metal.

Furthermore, a transferred arc thermal plasma is defined as an electrically generated plasma in which the ion temperature lies in the range 5000 K to 60,000 K and the molten bath forms a substantial part of the electrical circuit.

BRIEF SUMMARY OF THE INVENTION

In accordance with this invention there is provided a process for the refining of ferrochromium metal and a suitable metal oxide are heated in the presence of a transferred arc thermal plasma to effect a liquid slag to liquid metal refining in a substantially carbon free environment.

Further features of the invention provide for the heating to be carried out at atmospheric pressure or less than atmospheric pressure; for the high carbon ferrochromium metal to be in the form of fines (as herein defined) and to be preferably admixed, prior to melting, with oxide fines which may be agglomerated, or lumpy ore which may, in either case, be pre-reduced, pre-oxidized or otherwise pre-treated; for such fines to be, or to include, chromite fines; and for the feed materials to be preferably admixed with any required fluxes such as, for example, quartz or lime.

It will be understood that the expression "substantially carbon free environment" is intended to be interpreted as including the case where a consumable carbon electrode is employed to form the thermal plasma.

The process can be run as a multi-stage process with varying degrees of refining dependant upon the metal oxide to metal ratio. Final alloy or metal additions could be made to produce any desired final metal composition, such as, starting material for direct stainless steel production.

The process can be run as a single continuous process. A further alternative is to run the process intermittently or with the intermittent tapping of slag and/or alloy or even the intermittent addition of ore or other refining medium. A batch process is also possible and within the scope of this invention.

DETAILED DESCRIPTION OF THE INVENTION

In order to test the invention experiments were carried out in a transferred precessing plasma arc furnace manufactured by Tetronics Research and Development Company Limited and substantially as described in their British Pat. Nos. 1390351/2/3 and 1529526. The tests were carried out using a precessing speed of 50 rpm and a non-consumable electrode in the plasma gun. In these tests 100 parts ferrochromium metal fines having the following composition were mixed with 28.6 parts of Winterveld Ore having the composition given below and, 4.3 parts of quartz, the composition of which is also given below.

| Metal component = 88.6% of total with composition given below: | | Slag component = 11.4% of total with composition given below: | |
|---|---|---|---|
| Composition of "Metal Fines" (slag to metal ratio = 0.129) | | | |
| Chromium | 52.8% | $Cr_2O_3$ | 27.0% |
| Iron | 36.2% | FeO | 13.0% |
| Silicon | 3.0% | CaO | 2.2% |
| Carbon | 6.55% | $SiO_2$ | 47.7% |
| | | MgO | 1.0% |
| | | $Al_2O_3$ | 7.4% |
| Composition of Winterveld Chromite | | | |
| $Cr_2O_3$ | 44.6% | FeO | 23.3% | $SiO_2$ | 2.23% |
| CaO | 0.20% | MgO | 11.2% | $Al_2O_3$ | 13.7% |

The quartz had a composition of 0.20% FeO, 99.5% $SiO_2$ and 0.06% $Al_2O_3$.

If required, limestone or dolomite could be used as a flux to effect the removal of sulphur from the metal. Likewise sodium carbonate could be used for the removal of phosphorus. Titanium removal occurs automatically as a feature of the process and this improves the quality of the metal.

The above described mixture of raw materials was fed to the preheated furnace at a rate calculated to ensure that the metal and slag were maintained at a constant selected process temperature i.e. to maintain the required energy balance and maintain the slag and metal in a molten condition. The slag and metal were tapped after the addition of feed was complete.

The refining obtained was a reduction of the silicon content from 3 mass % to 0.84 mass % and a reduction of the carbon content from 6.55% to 4.10%. Thus an appreciable refining was achieved using the process of this invention. Lower silicon and carbon values are possible when the chromite ore or other suitable metal oxide to metal fines ratio is increased.

It is to be mentioned that the electrode used in the plasma gun can be either a non-consumable or a consumable graphite type of electrode. The use of an inert gas via the plasma gun was limited to the quantities required for operation of a stable thermal plasma and not specifically for any metallurgical purpose. Obviously more could be used, if desired. The furnace was not lined with any graphite or carbon layers which could contact the metal or molten slag. In this manner carbon was kept down to a minimum in the system and the stated degree of refining achieved.

The following is an example of results obtained by the use of a consumable electrode for the process for refining ferrochromium metal.

The metallic fraction, which constituted 89.7 percent of the mass of the material, had the following analysis by mass:

| | |
|---|---|
| Chromium | 51.2% |
| Iron | 39.0% |
| Silicon | 2.69% |

-continued

| | |
|---|---|
| Carbon | 5.7% |

The slag component had the analysis by mass:

| | |
|---|---|
| $Cr_2O_3$ | 13.0% |
| FeO | 3.87% |
| CaO | 1.05% |
| $SiO_2$ | 55.3% |
| MgO | 1.21% |
| $Al_2O_3$ | 18.3% |

The analysis of the chromite was similar to that used for the tests done with the non-consumable electrode and described above. The analysis of the limestone used as flux had the analysis (mass %):
FeO: 0.46 $SiO_2$: 2.07 CaO: 55.0
MgO: 0.53 $Al_2O_3$: 0.54

In this test 100 parts of ferrochromium metal fines were mixed with 28.6 parts Winterveld ore and 11.5 parts limestone. The above mixture was again fed to a preheated furnace at a rate calculated to ensure that the metal and slag were maintained at a constant selected process temperature to maintain the required energy balance.

In this case the refining obtained was a reduction of silicon content from 2.69 mass percent to 0.65 mass percent and a reduction of the carbon content from 5.7 mass percent to 5.2 mass percent.

The construction of the furnace used was similar in concept to that used in the first described test in that an oxide refractory material was used as a lining.

It will be understood that the invention provides a simple yet effective process for the refining of ferrochromium metal in which chromite ore can be used or, alternatively, any other oxide of a suitable nature. It is to be mentioned that the refining of the carbon and silicon automatically, in this method, results in a refining of the titanium content of the metal. This can be highly advantageous for certain applications of the metal.

What we claim as new and desired to secure by Letters Patent is:

1. A process for refining ferrochromium metal containing carbon or silicon by the removal of at least some of the carbon or silicon comprising the steps of:
    (a) feeding the ferrochromium metal and at least one metal oxide to a furnace having a substantially carbon free environment;
    (b) heating the ferrochromium metal and metal oxide by a transferred arc thermal plasma to a sufficiently high temperature both to maintain a slag phase containing the metal oxide and a ferrochromium metal phase in the molten condition, and to effect by the reduction of the metal oxide a liquid slag to liquid metal refining; and
    (c) tapping the slag and ferrochromium metal.

2. A process as claimed in claim 1 in which the heating is carried out at or below atmospheric pressure.

3. A process as claimed in either of claims 1 or 2 in which the ferrochromium metal is in the form of fines.

4. A process as claimed in claim 3 in which the ferrochromium metal fines have a size of less than about 2 mm in diameter.

5. A process as claimed in claim 1 further comprising mixing the ferrochromium metal and metal oxide prior to feeding the ferrochromium metal and metal oxide to the furnace.

6. A process as claimed in claim 1 in which the metal oxide is fed to the furnace in the form of at least one of the group consisting of: oxide fines, lumpy oxide ore, and both.

7. A process as claimed in claim 6 in which the oxide fines and lumpy oxide ore are pre-reduced, pre-oxidized, or pre-treated.

8. A process as claimed in either of claims 6 or 7 in which the oxide fines and lumpy oxide ore are chromite.

9. A process as claimed in claim 1 further comprising mixing the ferrochromium metal and metal oxide with one or more fluxes prior to feeding the ferrochromium metal and metal oxide to the furnace.

10. A process as claimed in claim 9 in which the fluxes include quartz.

11. A process as claimed in either of claims 9 or 10 in which the fluxes include at least one of the group consisting of limestone and dolomite.

12. A process as claimed in claim 9 in which the fluxes include sodium carbonate.

13. A process as claimed in claim 1 further comprising continuously feeding additional ferrochromium metal and metal oxide to a molten mass of ferrochromium metal and slag in the furnace.

14. A process as claimed in claim 13 in which the additional ferrochromium metal and metal oxide are fed to the molten mass and slag, at a rate controlled to maintain a predetermined temperature of the molten mass.

15. A process as claimed in claim 1 in which the transferred arc thermal plasma is generated using a non-consumable electrode.

16. A process as claimed in claim 1 in which the transferred arc thermal plasma is generated using a consumable electrode.

17. A refined ferrochromium metal produced by the process of claim 1.

* * * * *